Oct. 4, 1932.   W. E DEAN   1,880,864
FLUID PRESSURE BRAKE
Filed Dec. 7, 1928
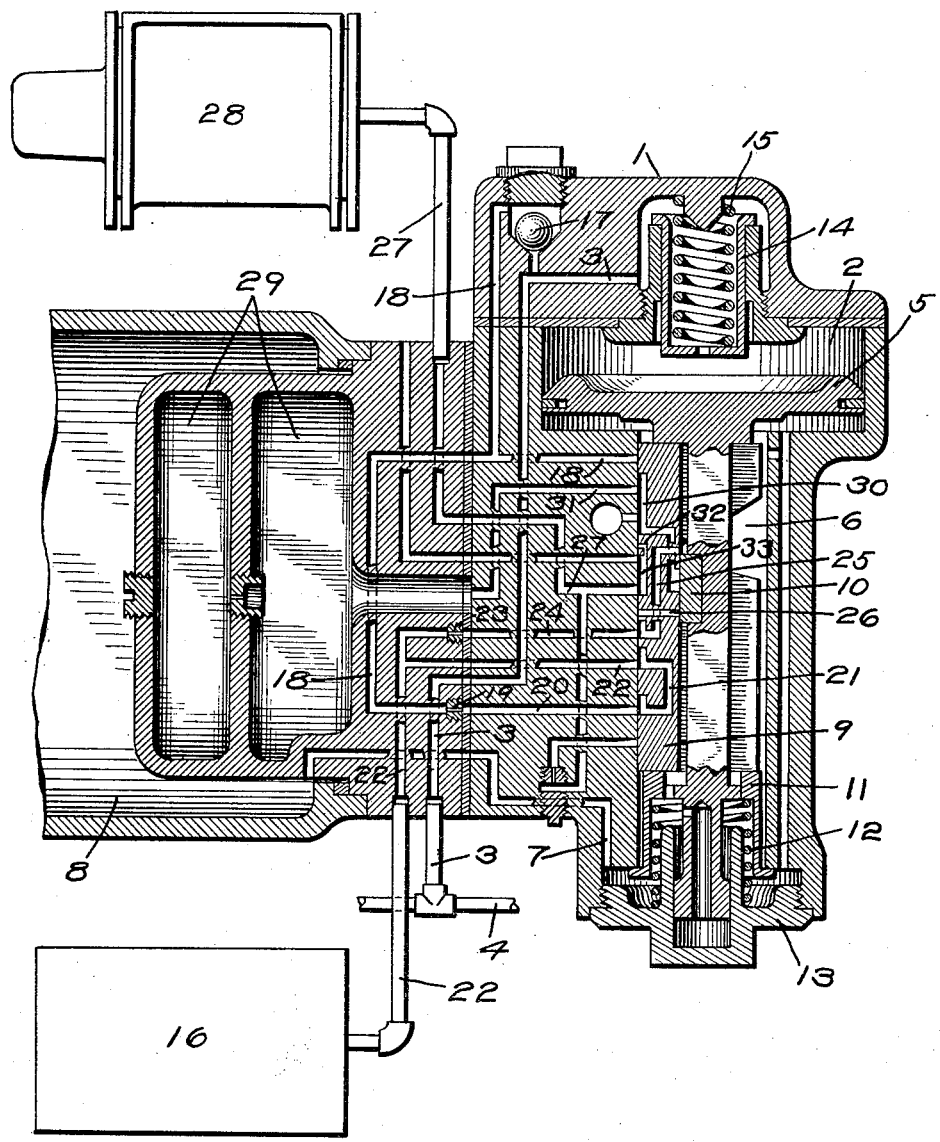
INVENTOR
WILLIAM E. DEAN
BY
ATTORNEY

UNITED STATES PATENT OFFICE

WILLIAM E. DEAN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed December 7, 1928. Serial No. 324,520.

This invention relates to fluid pressure brakes and more particularly to a triple valve device for such brakes.

The principal object of my invention is to provide an improved triple valve device which is simple in construction, efficient in operation and cheap to manufacture.

Another object of my invention is to provide a triple valve device in which the charging and recharging of the auxiliary reservoir is controlled through the triple valve slide valve.

A further object of my invention is to provide a triple valve device in which the charging and recharging of the auxiliary reservoir and supplemental or emergency reservoir from the brake pipe is effected past a single check valve and through the triple valve slide valve.

Other objects and advantages will appear in the following more detailed description of the invention.

In the accompanying drawing, the single figure is a diagrammatic sectional view of a fluid pressure brake equipment embodying my invention.

As shown in the drawing, the triple valve device may comprise a casing 1, having a piston chamber 2 connected through a passage 3 with the usual brake pipe 4 and containing a piston 5, and having a valve chamber 6 connected through a passage 7 with the usual auxiliary reservoir 8 and containing a main slide valve 9 and a graduating slide valve 10 adapted to be operated by the piston 5.

For retarding the release of the brakes, the triple valve device is provided with a retarding stem 11, which is mounted in the rear of valve chamber 6 and is adapted to engage the main slide valve 9. A retarded release spring 12 is interposed between a screw plug 13, which closes the end of the valve chamber 6, and the stem 11 and urges the stem forwardly. The usual graduating stem 14, subject to the pressure of a spring 15, is adapted to be engaged by the piston 5, when the piston moves out to effect a service application of the brakes.

In operation, fluid under pressure supplied to the brake pipe 4 flows through pipe and passage 3 to the piston chamber 2, and with the piston 5 in release position as shown in the drawing, fluid flows from the passage 3 to a supplemental or emergency reservoir 16, past a ball check valve 17 to a passage 18 and from thence through a choke 19, a passage 20, a cavity 21 in the main slide valve 9 and passage and pipe 22, thus charging the reservoir 16. From the passage 22 fluid flows to the auxiliary reservoir 8 through a choke 23, a passage 24, a port 25 in the main slide valve 9, valve chamber 6 and passage 7, thus charging the auxiliary reservoir.

Upon making a gradual reduction in brake pipe pressure to effect a service application of the brakes, the piston 5 is moved out, first shifting the graduating slide valve 10 so as to close the port 25 in the main slide valve 9 and open a service port 26 in this slide valve. The main slide valve 9 is then moved until the piston 5 engages the graduating stem 14. In this position of the slide valve 9, the service port 26 registers with a passage 27, so that fluid under pressure is supplied from the valve chamber 6 and the auxiliary reservoir 8 to the brake cylinder 28, to effect a service application of the brakes.

When the slide valve 9 is operated to service position, the usual local reduction in brake pipe pressure is effected by venting fluid under pressure from the brake pipe into quick service chambers 29 by way of passage 3, past the ball check valve 17 to passage 18 and from thence through a cavity 30 in the slide valve 9 and a passage 31.

To release the brakes, the brake pipe pressure is increased. On cars toward the head end of the train, where the rate of increase in brake pipe pressure is high, the triple valve piston 5 is moved to retarded release position, compressing the retarded release spring 12 by rearward movement of the retarding stem 11. In this position fluid is released from the brake cylinder 28, through a restricted tail port 32 in the slide valve 9 leading to an exhaust cavity 33, so that the exhaust of fluid from the brake cylinder is at a slow rate.

On cars toward the rear of the train, where the rate of increase in brake pipe pressure is less rapid, the triple valve piston 5 moves only to full release position, as determined by engagement of the slide valve 9 with the retarding stem 11. In this position, fluid is released from the brake cylinder at a more rapid rate, through the unrestricted cavity 33.

When the triple valve parts move to either full release or retarded release position in releasing the brakes after a service application, fluid under pressure flows from the fully charged supplemental reservoir 16 to the auxiliary reservoir 8 by way of pipe and passage 22, choke plug 23, passage 24, port 25 in the main slide valve 9 of the triple valve device, valve chamber 6 and passage 7 and after the auxiliary reservoir and supplemental reservoir pressures equalize, the final recharge of these reservoirs will be from the brake pipe in the same manner as before described. It will thus be seen that fluid under pressure assists in recharging the auxiliary reservoir and therefore permits the brake pipe pressure to increase at a faster rate than if the reservoir were charged with fluid under pressure from the brake pipe only.

It will be noted that no feed groove is provided around the triple valve piston and the charge and recharge of the auxiliary reservoir 8 and supplemental reservoir 16 from the brake pipe can take place only past the ball check valve 17 and through the slide valve 9 in the manner hereinbefore described. It will also be noted that when the slide valve 9 is operated to service position, it closes off the communication between the supplemental reservoir 16 and the auxiliary reservoir 8 so that the check valves, which have heretofore been employed for preventing back flow of fluid from the supplemental reservoir to the auxiliary reservoir, are eliminated, thus simplifying the construction of the triple valve device.

The recharge of the auxiliary reservoir 8 takes place at the same rate when the triple valve device is in full release and retarded release positions, since the recharge in both cases is effected through passages 18 and 20, cavity 21 in the slide valve 9, passages 22 and 24, port 25 in the slide valve 9, valve chamber 6 and passage 7.

Since fluid is not taken from the brake pipe at a faster rate when the triple valve is in full release position, the brake pipe pressure is permitted to build up at a faster rate on cars toward the rear of the train and consequently, the release of the brakes is accelerated at the rear of the train and a more uniform release throughout the train is thus effected.

A further simplification of the triple valve device is effected by the omission of the usual feed groove past the triple valve piston 5 and by controlling the charging of the auxiliary reservoir and supplemental reservoir through the slide valve 9, since the labor and time required in forming the feed groove accurately with relation to the ports and passages in the slide valve and slide valve seat, is eliminated.

The ball check valve 17 permits the supply of fluid under pressure to the auxiliary reservoir 8 and supplemental reservoir 16 when the triple valve device is in release or retarded release position, permits fluid under pressure to flow from the brake pipe to the quick service chamber when the triple valve device is operated to service position and also prevents the back flow of fluid under pressure from said auxiliary reservoir and supplemental reservoir to the brake pipe.

From the foregoing description, it will be understood that I have provided a simplified triple valve device in which the charge and recharge of the auxiliary reservoir and supplemental reservoir from the brake pipe is effected through the medium of the main slide valve of the triple valve device and in which the charge and recharge of these reservoirs is at the same rate regardless of whether the triple valve parts are in either full release or retarded release position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe, auxiliary reservoir and an additional reservoir, of a triple valve device comprising a piston subject to the opposing pressures of the brake pipe and auxiliary reservoir, a slide valve included in said triple valve device operative by said piston for controlling the supply of fluid under pressure from the brake pipe to said reservoirs, and means for preventing the back flow of fluid from said reservoirs to said brake pipe.

2. In a fluid pressure brake, the combination with a brake pipe, auxiliary reservoir and an additional reservoir, of a triple valve device comprising a piston subject to the opposing pressures of the brake pipe and auxiliary reservoir, a slide valve included in said triple valve device operative by said piston for controlling the supply of fluid under pressure from the brake pipe to said reservoirs, and a single valve for preventing back flow of fluid from said reservoirs to the brake pipe.

3. In a fluid pressure brake, the combination with a brake pipe, an auxiliary reservoir and an additional reservoir, of a triple valve device having a full release position and a retarded release position, and a slide valve included in said triple valve device operative to supply fluid under pressure from the brake pipe to the auxiliary reservoir at the same rate in full release and retarded release positions, through a cavity in said slide valve which establishes communication from said brake pipe to said additional reservoir.

4. In a fluid pressure brake, the combination with a brake pipe, an auxiliary reservoir, and an additional reservoir, of a triple valve device comprising a piston subject to the opposing pressures of the brake pipe and auxiliary reservoir, and a valve included in said triple valve device operated by said piston and having a cavity therein through which fluid under pressure is supplied from said brake pipe to said additional reservoir and having a port through which fluid under pressure flowing though said cavity is supplied to said auxiliay reservoir.

5. In a fluid pressure brake, the combination with a brake pipe, an auxiliary reservoir, and an additional reservoir, of a triple valve device comprising a piston subject to the opposing pressures of the brake pipe and auxiliary reservoir, and a valve included in said triple valve device operated by said piston and having a cavity therein through which fluid under pressure is supplied from said brake pipe to said additional reservoir and having a port through which fluid under pressure flowing through said cavity is supplied to said auxiliary reservoir at the same rate in either a full or retarded release position of the triple valve device.

In testimony whereof I have hereunto set my hand, this 5th day of December, 1928.

WILLIAM E. DEAN.